(12) United States Patent
Brage et al.

(10) Patent No.: US 9,964,198 B2
(45) Date of Patent: May 8, 2018

(54) LINEAR ELECTRO-MECHANICAL ACTUATOR

(71) Applicant: AKTIEBOLAGET SKF, Göteborg (SE)

(72) Inventors: Mikael Brage, Mölnlycke (SE); Par Hogberg, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/038,270

(22) PCT Filed: Nov. 14, 2014

(86) PCT No.: PCT/SE2014/051351
§ 371 (c)(1),
(2) Date: May 20, 2016

(87) PCT Pub. No.: WO2015/076725
PCT Pub. Date: May 28, 2015

(65) Prior Publication Data
US 2016/0298754 A1 Oct. 13, 2016

(30) Foreign Application Priority Data

Nov. 25, 2013 (SE) ...................................... 1300730

(51) Int. Cl.
*F16H 3/06* (2006.01)
*F16H 27/02* (2006.01)
(Continued)

(52) U.S. Cl.
CPC ..... *F16H 57/0406* (2013.01); *F16H 57/0497* (2013.01); *H02K 7/06* (2013.01); *F16H 2025/209* (2013.01); *F16H 2025/2084* (2013.01)

(58) Field of Classification Search
CPC ............. F16H 25/2418; F16H 57/0406; F16H 2025/204; F16H 57/0497; F16H 2025/2031; F16C 33/128
See application file for complete search history.

(56) References Cited

U.S. PATENT DOCUMENTS 4,137,784 A * 2/1979 Griffin ...................... B66F 3/08
254/103
5,906,136 A * 5/1999 Yabe ................... F16C 33/3713
277/562

(Continued)

*Primary Examiner* — Jake Cook
(74) *Attorney, Agent, or Firm* — Bryan Peckjian; SKF USA Inc. Patent Dept.

(57) ABSTRACT

The present invention relates to a linear electro-mechanical actuator for transferring a rotational motion to a linear motion. The actuator provides a piston having an outer load-carrying surface and being at least partly arranged inside a housing. The actuator further provides a transmission module adapted to transfer a rotational motion generated by a motor to a linear motion of the piston. The actuator includes a separating member and a lubricating member having a porous polymeric matrix and a lubricating material, the separating member and the load-carrying member being arranged adjacent to each other. Thereby, the actuator allows for lubrication of at least a portion of the outer load-carrying surface of the piston by the lubricating material upon movement of the piston. For instance, the linear electro-mechanical actuator may not require, or may at least minimize, the need of relubrication.

13 Claims, 5 Drawing Sheets

(51) Int. Cl.
*F16H 29/02* (2006.01)
*F16H 29/20* (2006.01)
*F16H 57/04* (2010.01)
*H02K 7/06* (2006.01)
*F16H 25/20* (2006.01)

(56) References Cited

U.S. PATENT DOCUMENTS

2002/0056333 A1 5/2002 Ohya
2008/0196523 A1 8/2008 Liu
2009/0308187 A1* 12/2009 Schmid ............... F16H 25/2418
 74/89.4
2010/0192713 A1 8/2010 Duits et al.
2013/0112022 A1* 5/2013 Shimizu ................. F16H 25/20
 74/89.34

* cited by examiner

Fig. 5

LINEAR ELECTRO-MECHANICAL ACTUATOR

CROSS-REFERENCE

This application is the U.S. National Stage of International Application No. PCT/SE2014/051351 filed on Nov. 14, 2014, which claims the benefit of priority from Swedish Patent Application No. 1300730-7 filed on Nov. 25, 2013, the contents of which are both herein incorporated by reference in their entirety.

TECHNICAL FIELD OF THE INVENTION

The present invention relates to a linear electro-mechanical actuator for transferring a rotational motion to a linear motion. The linear electro-mechanical actuator comprises a piston, a housing, a transmission module, a separating member and a lubricating member.

BACKGROUND

Linear actuators are used to move an object along a straight line, either between two end points or to a defined position. Linear electro-mechanical actuators typically incorporate a rotating electrical motor and some kind of mechanical transmission module to convert the relatively high-speed rotation of the motor to a low speed linear motion. This transmission module may incorporate a gear box and/or a screw shaft.

Linear electro-mechanical actuators are constructed to perform many thousands to hundreds of thousands, or more, strokes (i.e. movements of the object along the straight line) over relatively long travel distances. Upon use, surfaces of the linear actuators are thus subjected to stressing loads, such as rotational, radial and/or axial forces, which may throw off and/or scrape off lubricants being applied to these surfaces. Consequently, these surfaces require continuous relubrication in order to ensure a long service life of the linear actuators.

Today, relubrication is a troublesome operation and often large amounts of lubricants are wasted due to imprecise application with regard to both the location in the actuator and the amount of lubricants applied. Hence, there is a need in the art for more efficient lubrication of linear electro-mechanical actuators.

SUMMARY OF THE INVENTION

In a linear electro-mechanical actuator, an interface separating an inner milieu from an outer milieu is typically present. A piston, extending in an axial direction, may be at least partly arranged inside a housing and moveable relative to the housing in the axial direction. The housing generally defines the inner milieu, and may comprise an opening being adapted to receive a distal end of the piston. This opening is typically a part of the interface between the inner milieu and the outer milieu.

The piston is adapted to work in the axial direction, thereby moving between the inner milieu and the outer milieu via the opening of the housing. In order to not soil and damage the inner milieu, a separating member may be arranged at the interface or close to the interface. However, the service life and performance of the separating member is highly dependent on proper lubrication of its load-carrying surface(s) as well as of the outer surface of the piston, wherein the latter at least partly faces the separating member.

As stated above, actuators known in the state of the art can typically not satisfy the requirements regarding, for instance, a defined location of lubricants and a defined amount of lubricants. Typically, the actuators known in the state of the art are in need of regular relubrication due to e.g. migration of lubricants and excessive consumption of lubricants.

The present invention serves to overcome at least some of the problems known in the prior art by providing a linear electro-mechanical actuator which is capable of improving the application of the lubrication in terms of precision and functionality, while providing a useful amount of a lubricating material. The linear electro-mechanical actuator according to the present invention may not require or may at least minimize the need of relubrication.

According to an aspect of the present invention, a linear electro-mechanical actuator for transferring a rotational motion to a linear motion is provided. The linear electro-mechanical actuator comprises a piston having a distal end and a proximal end. The piston extends in an axial direction and has an outer load-carrying surface. The piston is at least partly arranged inside a housing and moveable relative to the housing in the axial direction. The housing has an opening being adapted to receive the distal end of the piston and defining an inner milieu. The linear electro-mechanical actuator further comprises a transmission module operatively connected to the proximal end of the piston and adapted to transfer a rotational motion generated by a motor to a linear motion of the piston in the axial direction. The linear electro-mechanical actuator further comprises a separating member being arranged adjacent to the opening of the housing and in between the piston and the housing as seen in a radial direction. The linear electro-mechanical actuator further comprises a lubricating member comprising a porous polymeric matrix and a lubricating material. The lubricating member is present in the inner milieu and arranged adjacent to the opening of the housing and in between the piston and the housing as seen in the radial direction. The lubricating member is arranged adjacent to the separating member. Thereby, the actuator allows for lubrication of at least a portion of the outer load-carrying surface of the piston by the lubricating material upon movement of the piston. Advantageously, the arrangement also allows for lubrication of a portion of the separating member, such as the surface facing the piston, via the lubrication of the outer surface of the piston.

Advantages of the linear electro-mechanical actuator according to the present invention, will be described in more detail throughout the application text, and are also summarized below:

The linear electro-mechanical actuator may be easily assembled in a dry state of the lubricating member, i.e. with no smeary grease, or other form of liquid or semi-liquid lubricating material, present except in the porous polymeric matrix of the lubricating member.

The linear electro-mechanical actuator may allow for a precise arrangement of the lubricating member, having a predetermined size and shape, at a location in the actuator where it is needed the most, i.e. adjacent to load-carrying surfaces subjected to harsh loads upon use of the actuator.

The linear electro-mechanical actuator may allow for less maintenance than required for a conventional actuator due to no need of relubrication during its service life as well as due to less wear of the components of the actuator.

The linear electro-mechanical actuator may easily be used due to a relatively controlled consumption of lubricating material causing substantially no leakage of lubricating material as well as due to its tolerance to e.g. washing.

The linear electro-mechanical actuator may have an improved dwell and stock time due to a high stability of the lubricating member leading to less problems with e.g. oil separation.

The linear electro-mechanical actuator may have a predictable service life due to a known amount of lubricating material in the lubricating member as well as due to a known location of the lubricating member in the actuator.

The linear electro-mechanical actuator may allow for environmentally friendly handling of the lubricating member including the unconsumed lubricating material at end of service life, in particular when provided as a separate member.

In an embodiment, the actuator allows for lubrication of substantially the entire outer load-carrying surface of the piston by the lubricating material. By the term "substantially" is herein meant at least 90% of the outer load-carrying surface of the piston, such as at least 95% of the outer load-carrying surface of the piston.

By the term "piston" is herein meant the moveable, typically stroking, component of the actuator performing a linear motion in the axial direction. The piston may extend from the inner milieu into the outer milieu and may retract from the outer milieu into the inner milieu upon use of the actuator. In a fully retracted state, the piston is mainly, typically entirely, arranged in the inner milieu. In a fully extended state, the piston is mainly, typically entirely, arranged in the outer milieu. The piston may sometimes be referred to as an extension member, e.g. an extension tube, of the linear electro-mechanical actuator. The piston typically has, but is not limited to, the general shape of a circular cylinder. The piston may be solid or hollow. Typically, the piston is at least partially hollow. The piston may be metallic. For instance, the piston may be made of steel, e.g. stainless steel.

The "axial direction" refers to the direction of the central axis of the piston. The "radial direction" refers to the direction of the radius of the piston.

By the term "lubricating member" is herein meant a member comprising a porous polymeric matrix and a lubricating material. The lubricating member is a component of the actuator serving to lubricate a load-carrying surface or load-carrying surfaces of the actuator. Such a load-carrying surface may be the outer surface of the piston, a portion of the separating member facing the piston, and/or a portion of the guiding member facing the piston. The lubricating member is arranged adjacent to the separating member. The lubricating member may be arranged between the piston and the housing as seen in a radial direction. Typically, the lubricating member is arranged close to the distal end of the piston, when the piston is in its fully retracted stet.

A load-carrying surface, e.g. the outer surface of the piston moving, such as sliding, against the lubricating member may be provided with an even and consistent film of the lubricating material. A moderate increase in temperature, which may occur upon use of the actuator, may cause the lubricating material to be pushed towards the surface of the polymeric matrix, as the thermal expansion of the lubricating material typically is greater than that of the polymeric matrix. The viscosity of the lubricating material typically decreases with increasing temperature. When the actuator stops working, the polymeric matrix may reabsorb excess lubricating material.

Typically, the porous polymeric matrix is saturated with the lubricating material. The lubricating member may comprise about 50-80%, such as 65-75%, e.g. 70%, by weight of the lubricating material. The lubricating material may for instance be a lubricating oil, such as a high quality synthetic oil, a very high quality synthetic oil, or other fluid lubricant of ample viscosity.

The polymeric matrix has a porous structure. Typically, the porous structure comprises millions of pores, e.g. micropores. Each pore has a size such small that they may hold the lubricating material by surface tension. The porous polymeric matrix may be a polymer matrix, such as a microporous polymer matrix, e.g. a polyethylene matrix. Typically, the porous polymeric matrix is moulded.

Due to the porosity of the polymeric matrix, the lubricating member has a relatively low strength and substantially no bearing capacity. Generally, the lubricating member is not load-carrying, since too much friction and/or heat would obstruct the pores of the lubricating member.

The lubricating member has predictable properties, such as a pre-determined volume and a known content of lubricating material, and thereby also a predictable service life. The predictable nature of the lubricating member prevents and avoids the actuator from relubrication. The size, i.e. the volume, may be adapted to correspond to the lubrication needs of the actuator. The level of saturation of lubricating material within the lubricating member may be adapted to correspond to the lubrication needs of the actuator.

The lubricating member has an advantage in that it remains firm in shape over its service life. A lubricating member according to the present invention is easy to apply to the linear electro-mechanical actuator, e.g. due to its non-smeary nature. Sometimes, the lubricating member is referred to as a solid oil.

The lubricating member may allow for a service life of the actuator device being increased with at least one order of magnitude expressed in strokes before breakage compared to conventional actuator devices using conventional lubricants, such as oil, grease etc.

The lubricating member may allow for an improved stocking and dwell time. The lubricating member keeps lubricating material, typically a lubricating oil, bonded better than e.g. soap in grease, and hence lessens the problem with oil separation over time.

The lubricating member has a good initial lubrication and allows for dry assembly. The lubricating member is relatively insensitive to dirt, cleaning and changes in temperature. For instance, the lubricating member may withstand temperatures within the range of from −40° C. to +85° C.

In the present invention, the lubricating member is arranged in close proximity to the surface(s) of the linear electro-mechanical actuator being subjected to harsh loads upon use of the actuator. The lubricating material of the lubricating member gradually migrates to the load-carrying surface(s).

Typically, the lubricating member is arranged such it allows for lubrication of a least a portion, either in the axial direction or the radial direction, of the load-carrying surface(s) by the lubricating material. For instance, the lubricating member may lubricate the entire periphery of a cross-section of the load-carrying surface(s). Advantageously, the lubricating member is arranged such it allows for lubrication of the entire load-carrying surface(s) by the lubricating material. For instance, the lubricating member lubricates the entire outer load-carrying surface of the piston, and may thus lubricate the outer load-carrying surface of the piston over the long travel distance of the piston.

The lubricating member may be arranged in close proximity to the separating member. Hence, the lubricating member may be arranged at a minor distance from the separating member. The separating member is arranged at the interface, or close to the interface, between the inner milieu and the outer milieu, thereby being subjected to a relatively harsh milieu, including friction and wear, upon use of the actuator. Advantageously, the lubricating member allows for lubrication of the separating member, in particular, of portions of the separating member facing the piston.

In an embodiment, the lubricating member is a separate component of the linear actuator. By being a separate component of the actuator, the lubricating member may easily be removed as a solid part (excluding the small amount of lubricating material that may gradually migrate to the surface(s) being subjected to a load upon use of the actuator) and be recycled at the end of life of the actuator. A lubricating member being provided as a separate component differs from e.g. a surface treatment layer or a surface treatment composition provided on the outer load-carrying surface of the piston. Alternatively, the lubricating member may be an integrated component of the actuator.

The lubricating member may have a shape suitable for its intended use. In an embodiment, the lubricating member has the shape of a bushing. A bushing may easily be arranged around the piston, and may also easily be separated therefrom. In such an arrangement, the lubricating member may surround the entire periphery of a cross-section of the piston.

Alternatively, the lubricating member being provided as a separate component may have the shape of at least three separate points or separate flanges. In such an arrangement, the lubricating member typically does not surround the entire periphery of a cross-section of the piston, but a portion of the periphery of a cross-section of the piston.

The lubricating member may comprise an amount of lubricating material proportional to the needs of the electro-mechanical actuator during its entire service life. Thus, the amount of lubricating material in the lubricating member may be optimized both economically and environmentally based on the expected service life of the actuator.

By the term "separating member" is herein meant a component of the actuator being arranged at the interface between the inner milieu and the outer milieu or at least close to this interface. One function of the separating member is to separate the inner milieu from the outer milieu in, or close to, the opening of the housing adapted to receive the distal end of the piston.

The separating member is typically arranged in between the piston and the housing as seen in a radial direction. The separating member may surround either the entire periphery of a cross-section of the piston or a portion thereof. The separating member may be arranged about the piston. The separating member is typically adapted to receive the distal end of the piston.

In an embodiment, the separating member is arranged such that it surrounds the entire periphery of a cross-section of the piston which forms a portion of the outer load-carrying surface of the piston.

In an embodiment, the separating member is a scraper. A scraper is typically adapted to clean the outer load-carrying surface of the piston from dirt and dust soiling the surface of the piston while it retracts into the inner milieu from the outer milieu. Thus, the scraper serves to preserve a relatively clean inner milieu of the actuator. The scraper is typically made in moulded plastics. The scraper may be arranged about the piston.

In an embodiment, the separating member is a sealing member. A sealing member is typically adapted to seal the interface between the outer load-carrying surface of the piston and the housing in the radial direction. Thus, the sealing member serves to seal the opening between the inner milieu and the outer milieu in order to prevent leakages. The sealing member is typically made in moulded plastics. The sealing member may be arranged about the piston.

Both a scraper and a sealing member may be present in the linear electro-mechanical actuator. In an example embodiment, the actuator comprises a first separating member being a scraper and a second separating member being a sealing member. The scraper may be arranged relatively closer to the outer load-carrying surface of the piston. The sealing member may be arranged to seal the opening present in the radial direction between the scraper and the housing.

In an embodiment, the linear electro-mechanical actuator further comprises a guiding member. The lubricating member is arranged in between the separating member and the guiding member as seen in the axial direction. Optionally, the lubricating member may also allow for lubrication of the guiding member via the lubrication of the outer surface of the piston.

By the term "guiding member" is herein meant a component of the linear electro-mechanical actuator serving to support and guide the piston over its, oftenly relatively long, travel distance relative to the housing. The guiding member is generally arranged in the inner milieu of the actuator formed by the housing (i.e. in the inner milieu of the housing). The guiding member may be arranged between the piston and the housing as seen in the radial direction.

The guiding member may have the shape of a bushing or a sleeve, thereby generally surrounding the entire periphery of a cross-section of the piston. The guiding member may be arranged about the piston. However, the guiding member does not necessarily have to surround the entire periphery of a cross-section of the piston, but may for instance consist of three separate points or flanges. The guiding member may be a linear guiding member. For instance, the guiding member may be a perforated sheet.

The guiding member may be an integrated part of the actuator, e.g. an integrated part of the housing. Alternatively, the guiding member may be a separate component of the actuator.

By the term "housing" is herein meant the component of the actuator defining the inner milieu and serving to protect the components arranged therein. The housing is generally stationary in relation to the moveable piston. The housing may sometimes be referred to as a protection member, e.g. a protection tube, of the linear electro-mechanical actuator. The housing may be cylindrical or tubular. Typically, the housing has the shape of a hollow circular cylinder.

In an embodiment, the housing has the shape of a cylinder, such as a circular cylinder. The housing may be metallic. For instance, the housing may be made of steel, e.g. stainless steel.

By the term "transmission module" is herein meant the module of components of the actuator being adapted to transfer a rotational motion generated by a motor to a linear motion of the piston in the axial direction, In an embodiment, the transmission module comprises a rotating portion and a non-rotating portion being operatively engageable to each other. The non-rotating portion is operatively connected to the proximal end of the piston. The transmission module is adapted to transfer a rotational motion of the rotating portion to a linear motion of the piston in the axial direction via the non-rotating portion.

The transmission module may comprise a screw having a threaded outer surface, and a nut having a threaded inner surface, wherein the screw and the nut are engageable to each other. The threading of the screw and the threading of the nut typically has the same pitch. In this example, the nut is typically operatively connected to the proximal end of the piston.

The screw may be a sliding screw, a roller screw or a boll roller screw. The nut may be a torotionally locket nut, such as a sliding nut, or a nut comprising rolling elements, such as a ball nut or a roller nut. Generally, the nut is complementary to the screw.

In an embodiment, the rotating portion is a screw and the non-rotating portion is a nut.

In another embodiment, the rotating portion is a nut and the non-rotating portion is a screw.

One common type of linear actuators incorporates a screw shaft with a nut running thereon. The screw shaft extends over the full length of the actuator and sets the operating length of the actuator. Since the nut is held in a non-rotatable state, the nut will be displaced when the screw shaft is rotated by the motor. The nut may incorporate rolling elements, such as balls or rollers, between the screw shaft and the nut. This will allow for a high-efficiency linear actuator with high load transfer and long service life. The nut may also engage directly with the screw shaft, i.e. a sliding screw design. In this case, the nut is preferably made of a plastic material.

Generally, a linear electro-mechanical actuator further comprises, or is connected to, a motor, such as an electrical motor. The electrical motor may generate a rotational motion of the transmission module. The motor may comprise a motor element, which may be fixedly attached to the housing, and a rotor element, which may be fixedly attached to the transmission module.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing embodiments of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
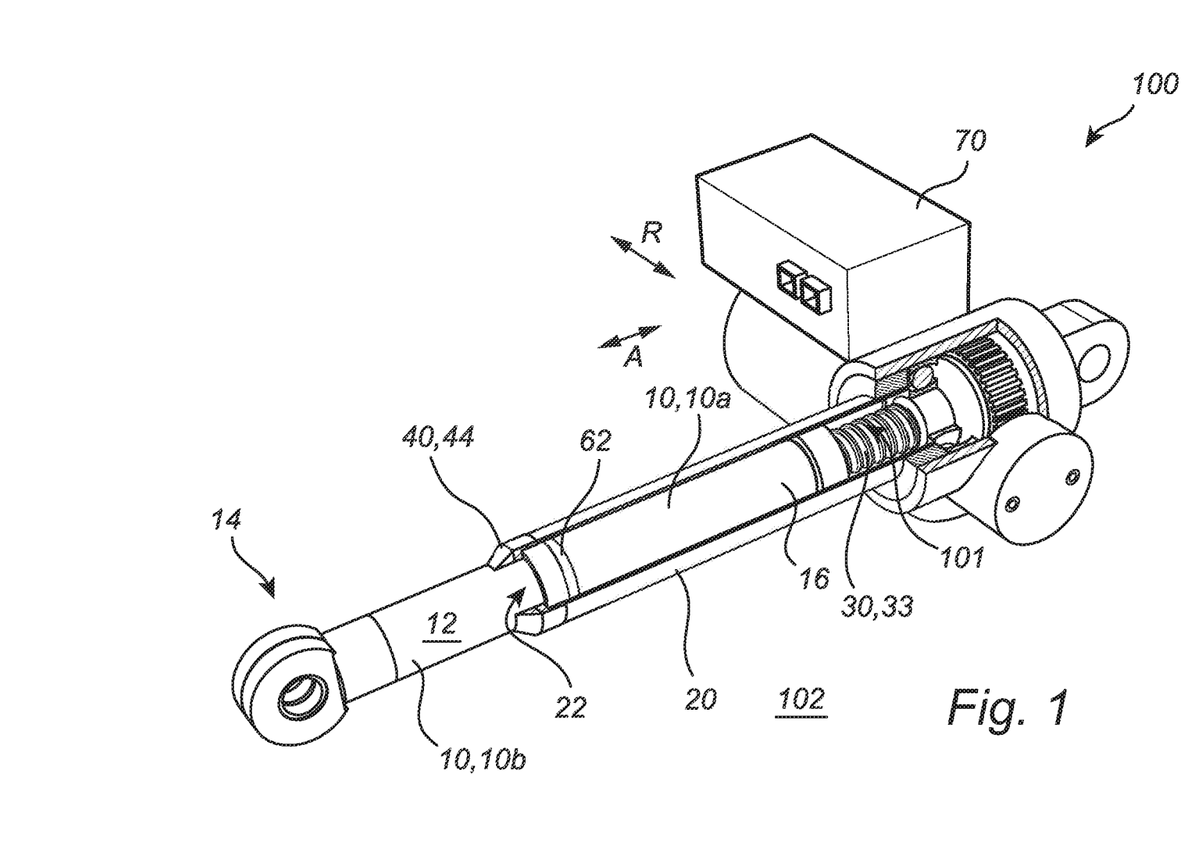
FIG. 1 presents a perspective partially sectioned schematic view of a linear electro-mechanical actuator according to an example embodiment of the present invention.

The present invention relates to a linear electro-mechanical actuator 100 for transferring a rotational motion to a linear motion, which is schematically shown in FIG. 1. It should be readily appreciated that the linear electro-mechanical actuator may sometimes be denoted as the linear actuator or the actuator for the sake of simplicity. The actuator comprises a piston 10, a housing 20, a transmission module 30, and a separating member 40. In FIG. 1, the example embodiment of the actuator here further comprises a guiding member 62 and a motor 70. Throughout this description, the piston extends in the axial direction A and in the radial direction R. The linear electro-mechanical actuator further comprises a lubricating member (not shown in FIG. 1) described in more detail below.

The piston 10 has a distal end 14 and a proximal end 16. The piston 10 extends in an axial direction A and has an outer load-carrying surface 12. The piston 10 is moveable relative to the housing 20 in the axial direction A. The housing 20 has an opening 22 being adapted to receive the distal end 14 of the piston 10. The housing 20 defines an inner milieu 101. Here, the housing 20 has the shape of a circular cylinder.

As shown in FIG. 1, the piston 10 is at least partly arranged inside the housing 20. The part of the piston 10a being arranged inside the housing is arranged in the inner milieu 101. The part of the piston 10b extending outside the housing is arranged in the outer milieu 102. In a fully retracted state, the piston 10 is mainly, such as entirely, arranged in the inner milieu 101. In a fully extended state, the piston 10 is mainly, such as entirely, arranged in the outer milieu 102. In FIG. 1, the piston is in a partly extended state.

The transmission module 30 is operatively connected to the proximal end of the piston 10 and adapted to transfer a rotational motion generated by the motor 70 to a linear motion of the piston 10 in the axial direction A.

Although not strictly required, the transmission module 30 here comprises a rotatable screw shaft 33 with a non-rotatable nut (not shown) running thereon. The screw shaft extends over the full length of the actuator and sets the operating length of the actuator. The nut is held in a non-rotatable state, and is displaced when the screw shaft is rotated by the motor 70. The transmission module 30 is at least partly arranged inside the piston 10.

The separating member 40 is arranged adjacent the opening of the housing 20 and in between the piston 10 and the housing 20 as seen in a radial direction R.

The separating member 40, herein shown as a scraper 44, separates the inner milieu 101 from the outer milieu 102 at an opening 22 of the housing adapted to receive the distal end 14 of the piston. The scraper 44 further serves to clean the outer surface 12 of the piston when retracting from the outer milieu 102 into the inner milieu 101.

As mentioned above, the linear actuator may typically, but not strictly necessarily, include a guiding member. In the example embodiment shown in FIG. 1, the guiding member 62 here is arranged in the inner milieu in between the piston and the housing as seen in the radial direction R. The guiding member 62 may be arranged either closer to the proximal end of the piston or closer to the distal end of the piston. In FIG. 1, the guiding member is arranged rather in the centre part of the piston. The guiding member serves to keep the piston 10 on track during its linear movements in the axial direction A. In particular, the guiding member serves to guide the piston such that it travels efficiently as it moves in the axial direction relative the housing.

When being arranged relatively close to the distal end of the piston in its fully retracted state, the guiding member 62 advantageously serves to prevent wear on the separating member 40 caused by the piston 10 as well as scrapping off of lubricating material from the outer surface 12 of the piston while passing the opening 22 and the separating member.

Figure 2:
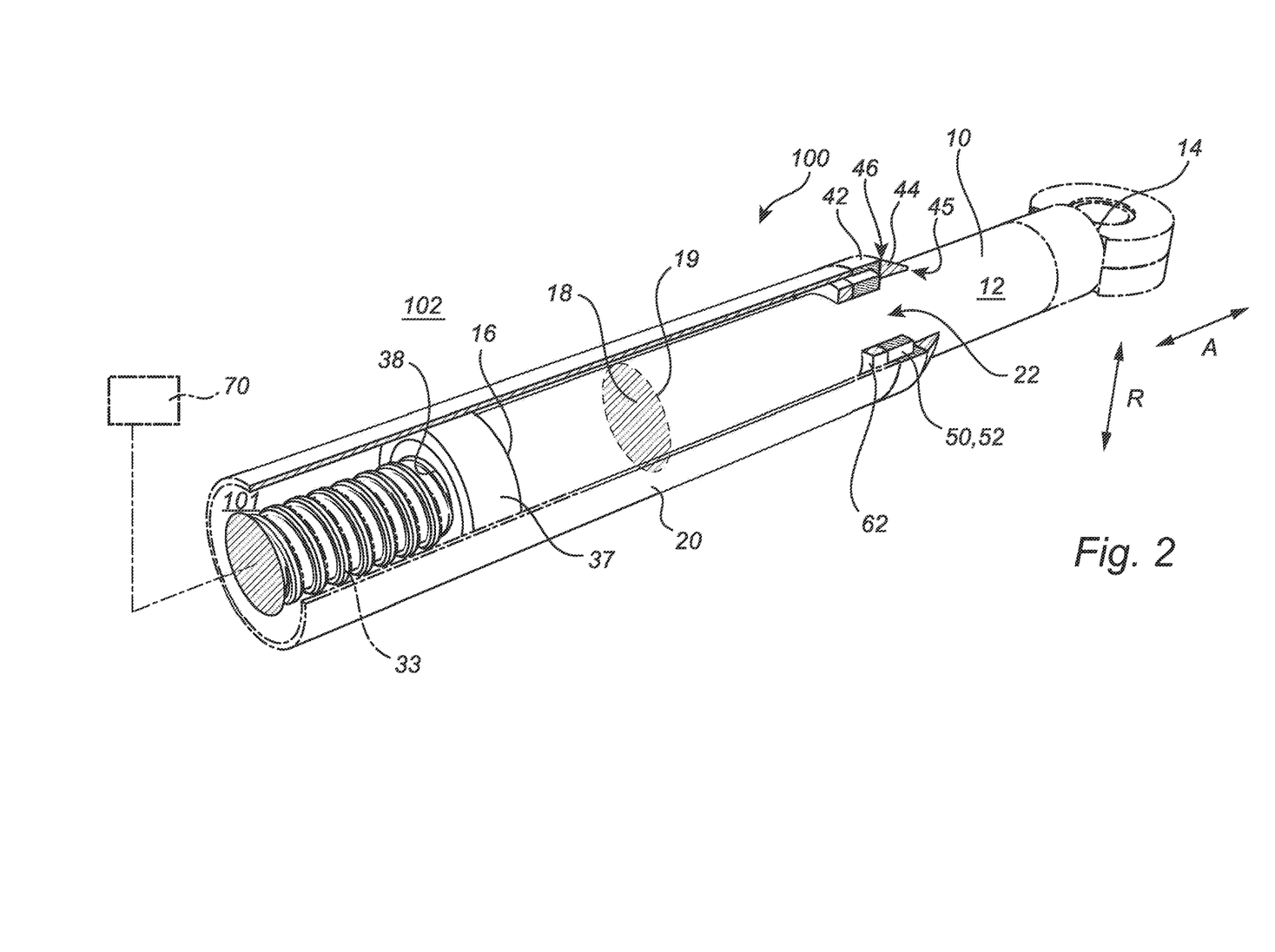
FIG. 2 presents a perspective partially sectioned schematic assembled view of a portion of a linear electro-mechanical actuator according to an example embodiment of the present invention.
Figure 3:
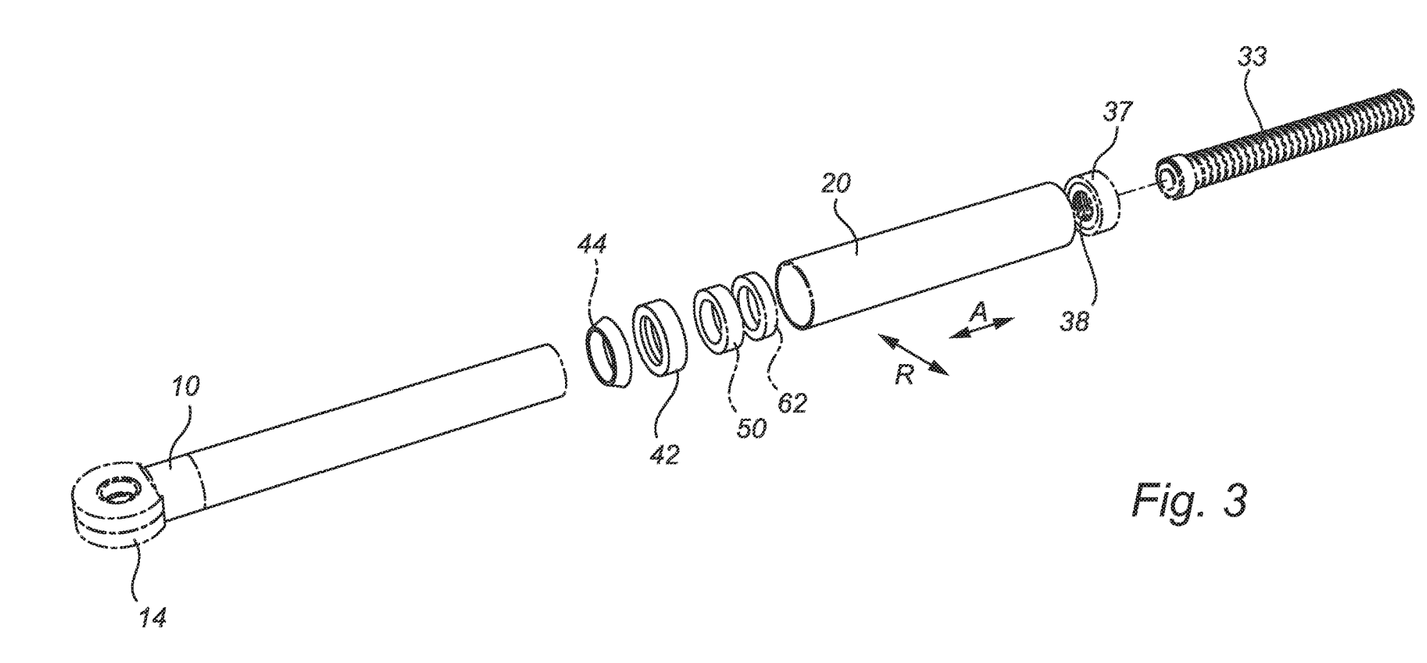
FIG. 3 presents a perspective partially schematic exploded assembly view of a portion of a linear electro-mechanical actuator according to an example embodiment of the present invention.

In FIGS. 2 and 3, a portion of the linear electro-mechanical actuator 100 in FIG. 1 is shown in more detail, namely, the lubricating member 50 and its surroundings. FIG. 2 shows the lubricating member 50 and its surroundings in an assembled state, while FIG. 3 is an exploded view of the lubricating member 50 and its surroundings. All features of the actuator 100 are not explicitly shown in both FIGS. 2-3.

The piston 10 having a distal end 14 and a proximal end 16 extends in the axial direction A. The distal end extends into the outer milieu 102, and the proximal end is arranged inside the housing 20 and, thus, in the inner milieu 101.

The proximal end 16 of the piston is operatively connected to a nut 37 of a transmission module. The nut 37 has a threaded inner surface 38 and is operatively engageable with a screw 33 of the transmission module. The screw has a treaded outer surface 34. A rotational motion of the screw may be generated by a motor 70.

The lubricating member 50 comprises a porous polymeric matrix and a lubricating material. As illustrated in FIG. 2, the lubricating member 50 is present in the inner milieu 101 and is arranged adjacent to the opening 22 of the housing 20 and in between the piston 10 and the housing 20 as seen in the radial direction R.

At the interface between the inner milieu and the outer milieu, a sealing member 42 and a scraper 44, respectively, are arranged. Both the sealing member 42 and the scraper 44 are arranged in between the piston 10 and the housing 20 as seen in the radial direction. In FIG. 2, both separating members 42, 44 are arranged about the piston and surround the entire periphery 19 of a cross-section 18 of the piston.

Accordingly, in this example embodiment, the linear actuator here includes a first separating member being a scraper and a second separating member being a sealing member. However, as mentioned above, the linear actuator may only include one separating member in the form of a scraper. In another example embodiment, the linear actuator may only include one separating member in the form of a sealing member.

As illustrated in FIG. 3, the sealing member 42 here has the shape of a bushing. The sealing member seals the space between the outer surface 12 of the piston and the inner surface of the housing. The inner surface of the housing faces the outer surface of the piston.

Moreover, the scraper 44 here has a conical shape, with a first end 45 having a periphery substantially equal to or slightly larger than the periphery of a cross-section of the piston and a second end 46 having a periphery substantially equal to or slightly smaller than the periphery of a cross-section of the housing. As is illustrated in FIG. 2, the first end 45 of the scraper faces the outer milieu and the second end 46 of the scraper faces the inner milieu.

The sealing member 42 and the scraper 44 are arranged in contact to each other, or in close proximity to each other, as shown in FIG. 2. Hence, the sealing member 42 may be arranged at a minor distance from the scraper 44 without departing from the scope of the present invention as long as the functions of the arrangements are maintained.

As illustrated in FIGS. 2 and 3, the actuator 100 here further includes a guiding member 62 having the shape of a sleeve, surrounding the entire periphery of a cross-section of the piston. The guiding member 62 is entirely arranged in the inner milieu, in between the piston and the housing as seen in the radial direction R. As mentioned above, it is to be noted that the guiding member is only an optional component of the actuator.

As illustrated in FIG. 2, the lubricating member 50 is arranged adjacent to the separating member 40. That is, the lubricating member 50 is arranged adjacent to the separating member 40 as seen in the axial direction A. Further, the lubricating member 50 of the actuator here is arranged in between the guiding member 62 and the sealing member 42 as seen in the axial direction A.

In FIG. 2, the lubricating member has the shape of a bushing 52, surrounding the entire periphery of a cross-section of the piston. The lubricating member 50 is arranged such that it allows for lubrication of the outer surface of the piston, the sealing member and the scraper.

It should be readily appreciated that in all of the embodiments of the present invention, the lubricating member may not necessarily be a bushing. Accordingly, the lubricating member can be provided in several different forms as long as the lubricating member can include a porous polymeric matrix and a lubricating material while fulfilling the required function of the lubricating member.

As illustrated in FIG. 2, the separating members 42, 44 here are arranged about the piston. Analogously, the lubricating member 50 here is arranged about the piston. Analogously, the guiding member 62 here is arranged about the piston.

Typically, the guiding member 62 is load-carrying, while the lubricating member 50 is not. Optionally, although not strictly required, also at least one of the separating members 42, 44 is load-carrying.

In order to ensure a smooth operation of the linear actuator, the piston 10 should be freely moveable in the axial direction relative to the guiding member 62, the lubricating member 50 and the separating members 42, 44.

The arrangement of the linear electro-mechanical actuator, shown in general in FIG. 1 and more in detail in FIGS. 2 and 3, allows for lubrication of at least a portion of the outer load-carrying surface 12 of the piston 10 by the lubricating material of the lubricating member 50 upon movement of the piston.

In all of the embodiments of the present invention, there is provided a linear electro-mechanical actuator which is capable of improving the application of the lubrication in terms of precision and functionality, while providing a precise amount of a lubricating material. In this context, the linear electro-mechanical actuator according to the present invention may not even require relubrication. More specifically, by the arrangement of the linear electro-mechanical actuator as described above, it becomes possible to assemble the actuator easily in a dry state of the lubricating member, i.e. with no smeary grease, or other form of liquid or semi-liquid lubricating material, present except in the porous polymeric matrix of the lubricating member. In addition, the linear electro-mechanical actuator may easily be used due to a relatively controlled consumption of lubricating material causing substantially no leakage of lubricating material as well as due to its tolerance to e.g. washing as well as the linear electro-mechanical actuator may allow for environmentally friendly handling of the lubricating member including the unconsumed lubricating material at end of service life, in particular when provided as a separate member.

Examples

Performance tests have been performed by the inventors in order to support the inventiveness of the present invention. As will be shown below, the performance tests showed surprisingly good results. It is to be noted that the performance tests include some further components of the linear actuator which are considered only optional for the present invention.

In more detail, the performance tests focusing on wear under normal circumstances related to lubrication of a piston, a guiding member and a sealing member in a so-called actuator of the type SKF ActSys GBG 0407538 (SKF, Sweden). A conventional SKF ActSys GBG 0407538 actuator comprising grease as lubricating material was compared to a modified SKF ActSys GBG 0407538 actuator comprising a lubricating member according to the invention, namely, a so-called solid oil.

In the both tested actuators, the piston was guided by a guiding member and sealed by a sealing member to the housing. The guiding member had the shape of a sleeve. The sealing member had the shape of a bushing (a so-called lip sealing).

In the tested modified actuator, the lubricating member was arranged in between the sealing member and the guiding member in the axial direction. The lubricating member had the shape of a bushing arranged to surround the periphery of a cross-section of the piston. In the test, the bushing had an outer diameter of 33 mm, an inner diameter of 28 mm and a width of 10 mm, giving it a volume of 2.4 cm3. The lubricating member, the sealing member and the piston were assembled in a dry state (i.e. in a non-lubricated state).

Tests were set up to run for some 500 000 cycles, both to pronounce the wear for regular usage as well as to give an indication of usability of the SKF ActSys GBG 0407538 actuator where an $L_{10}$ value of 1 500 000 cycles are used. The $L_{10}$ value gives an indication of the service life of the actuator by stating that less than 10% of the actuators break down before the present number of cycles is reached.

To accentuate a radial load over the guiding member the actuator was dislocated with up to 3 cm thereby applying an uneven load. No other extra artificial wear condition, such as dirt, heat or moist, was introduced during the tests.

Test 1: A Comparative Test Between a Conventional SKF ActSys GBG 0407538 Actuator (SKF, Sweden) and a SKF ActSys GBG 0407538 Actuator Comprising a Lubricating Member The actuators were mounted vertically with a pushing load during the test.

During the initial 50 000 cycles, a forced radial load of 15 mm and a 50 kg load, which corresponded to a radial load of approximately 50 N over the guiding member, was used. The speed was set to approximately 75 mm/s.

During the subsequent 450 000 cycles, a forced radial load of 35 mm and a 10 kg load, which corresponded to approximately the same radial load as above (but with less back-driving force), was used. The speed was set to approximately 85 mm/s.

The length of the stroke was approximately 220 mm, which resulted in a total travel distance of the sealing member relative the piston of 220 km during the test.

Wear and cleanliness on the piston and the sealing member on each of the actuators were observed during the test. At some points during the tests and eventually when reaching 500 000 cycles, the actuators were disassembled and the sealing member, the piston and the guiding member were further visually observed for wear.

During the initial 75 000 cycles, the piston of the conventional actuator run drier and started to build up debris at the sealing member and showed typical blackening of its surface. During the subsequent cycles up to a total of 500 000 cycles, the actuator showed increased wear of the sealing member and the guiding member as well as increased discoloring of the piston.

During the initial 75 000 cycles, the piston of the modified actuator comprising a lubricating member became quite oily with a pronounced wet ring at the end of each stroke and remained clean. During the subsequent cycles up to a total of 500 000 cycles, the wear of the sealing member and the guiding member as well as the discoloring of the piston remained marginal.

The weight of the lubricating member, therein a bushing of solid oil, was measured before and after the test, respectively, in order to quantify the consumption of the lubricating material of the lubricating member.

Before the test, the lubricating member measured 1.94 gram. After 160 000 cycles, the lubricating member measured 1.92 gram. At the end of the test, i.e. after 500 000 cycles, the lubricating member measured 1.89 gram. The lubricating member in the modified actuator allowed for an at least almost linear consumption of lubricating material during the cycles run by the actuator. This result implies that a more efficient lubrication was enabled in the modified actuator than in a conventional actuator both with regard to location and amount of lubricating material.

Test 2: A Test to Observe the Wear of the Sealing Member

In Test 2, the same actuators as in Test 1 were used. The actuators were mounted horizontally without any external load during the test. A total of 500 000 cycles was run.

The initial 250 000 cycles were run at 85 mm/s, and the final 250 000 cycles were run at 100 mm/s. The forced radial load was kept at 35 mm, which corresponded to a radial load of approximately 50 N. The length of the stroke was approximately 230 mm, which resulted in a total travel distance of the sealing member relative the piston of 230 km during the test.

The pressure inside the actuator was measured after a certain numbers of cycles. The time to reach atmospheric pressure was also measured. In an ideal state, the pressure difference in the inner milieu corresponds to the time for balancing the pressure difference in the extended state of the actuator. Thus, the variance in the measured parameters was presumed to correspond to the wear of the sealing member and the guiding member, respectively.

The pressure inside an actuator is build up on a retracting stroke. Vacuum in an actuator is build up on an extending stroke.

In the test, it was seen that the pressure built up on a retracting stroke and the time to reach atmospheric pressure slightly increased over the run cycles.

Figure 4:
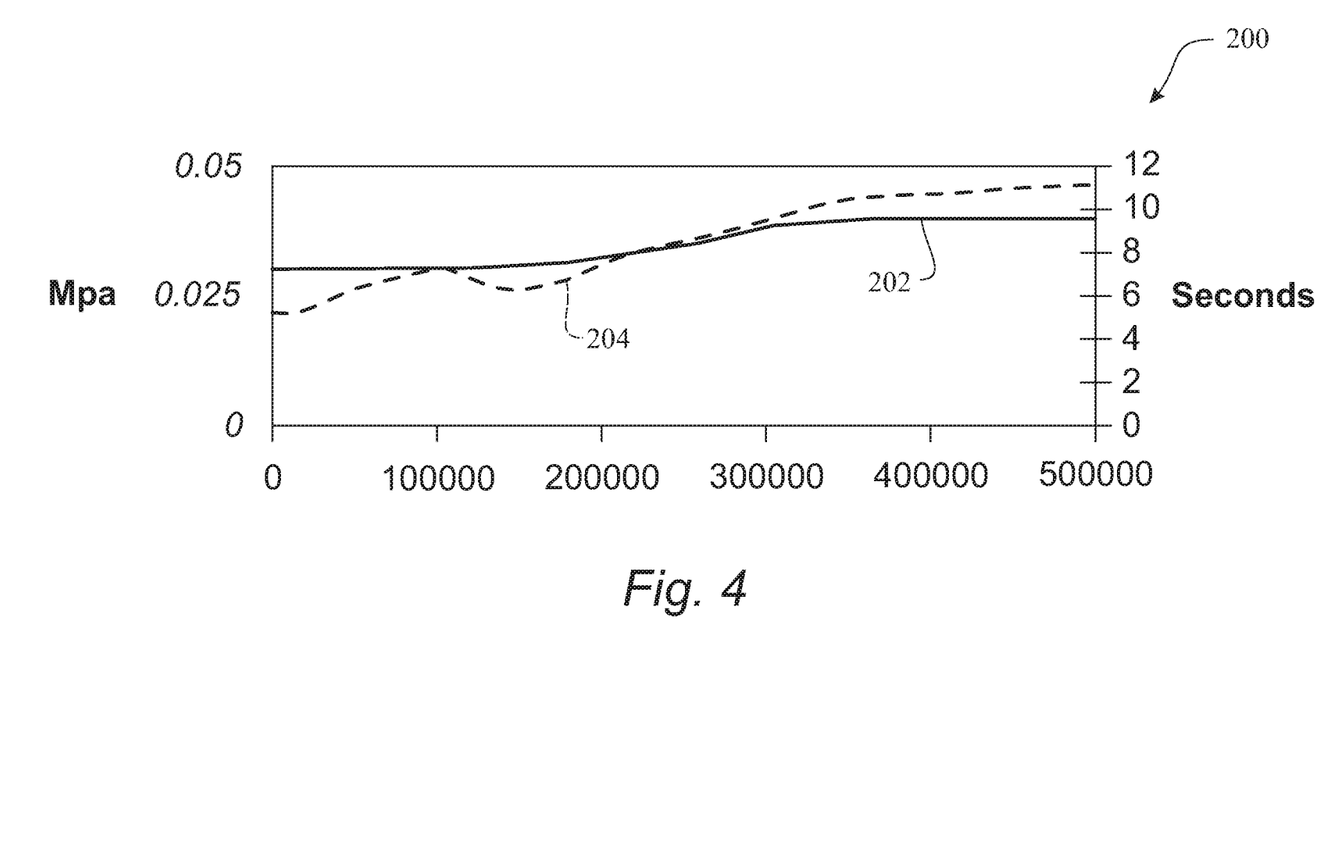
FIG. 4 presents a chart illustrating a pressure built up in the actuator on a retracting stroke and time to reach the atmospheric pressure, respectively.

FIG. 4 presents a chart 200 illustrating a pressure built up in the actuator on a retracting stroke and time to reach the atmospheric pressure, respectively.

In FIG. 4, the solid line 202 corresponds to the pressure, measured in MPa, built up in the actuator on a retracting stroke, and the dotted line 204 corresponds to the time, measured in seconds, to reach the atmospheric pressure.

Both results indicate that the leakage of air through the sealing member and the guiding member, respectively, decreased over the run cycles.

In the test, it was seen that the vacuum built up on an extending stroke and the time to reach atmospheric pressure slightly increased over the run cycles.

Figure 5:
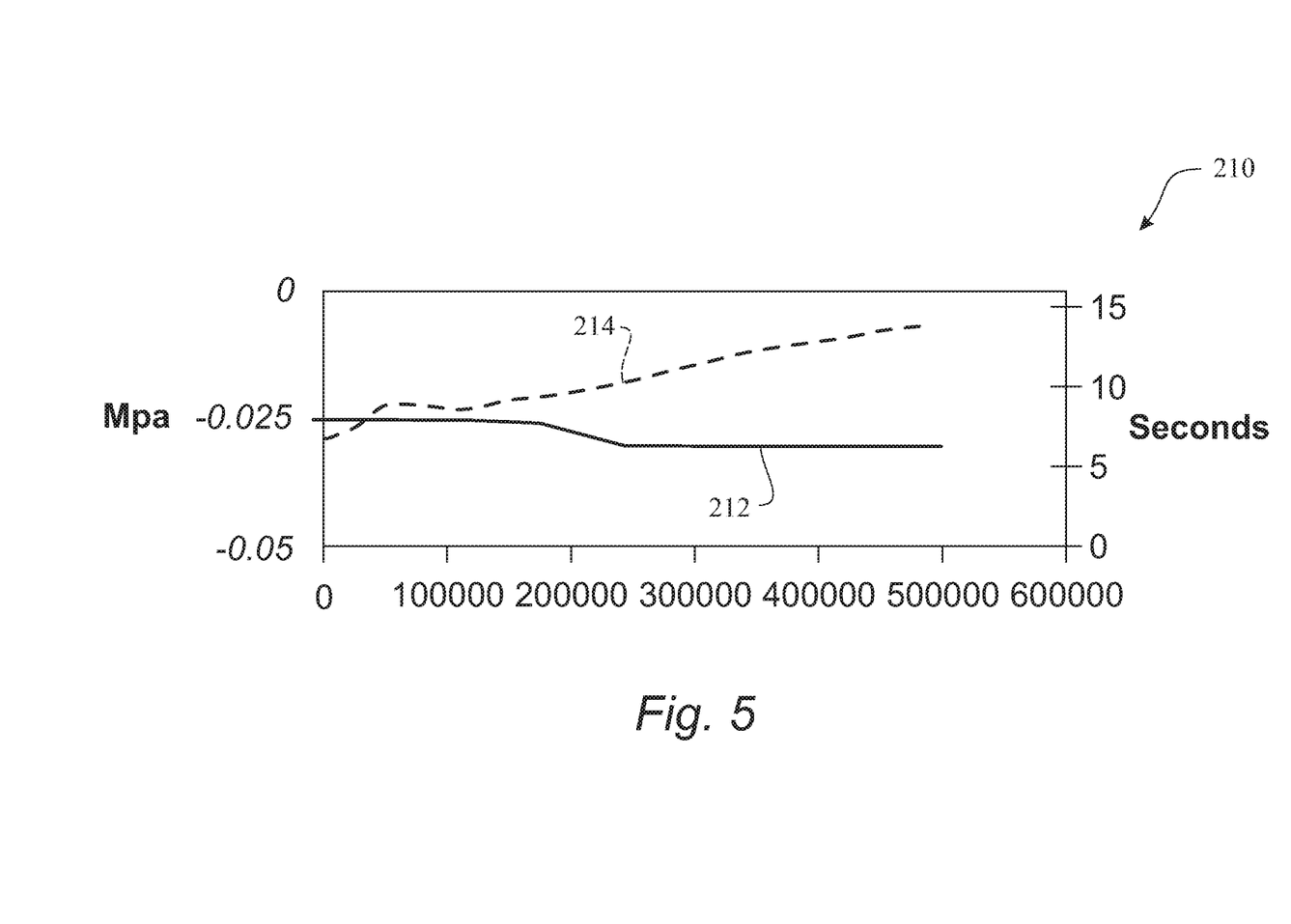
FIG. 5 presents a chart illustrating a chart illustrating a vacuum built up in the actuator on an extending stroke and time to reach the atmospheric pressure, respectively.

FIG. 5 presents a chart 210 illustrating a vacuum built up in the actuator on an extending stroke and time to reach the atmospheric pressure, respectively.

In FIG. 5, the solid line 212 corresponds to the vacuum, measured in MPa, built up in the actuator on an extending stroke, and the dotted line 214 corresponds to the time, measured in seconds, to reach the atmospheric pressure.

Both results indicate that the leakage of air through the sealing member and the guiding member, respectively, decreased over the run cycles.

Before the test, the lubricating member measured 1.95 gram. At the end of the test, i.e. after 500 000 cycles, the lubricating member measured 1.90 gram.

To conclude, the results of the tests were that the actuator comprising a lubricating member showed less signs of wear, had a more persistent and controlled lubrication as well as a neater appearance than the actuator comprising conventional grease.

These advantages may lead to less problems relating to excessive grease leakage from the actuator onto a door mechanism compartment as well as a facilitated assembly process of the actuator due to a solid lubricating member instead of loose grease.

Additionally, variations to the disclosed example embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

REFERENCE NUMBERS 100 linear electro-mechanical actuator
101 inner milieu
102 outer milieu
A axial direction
R radial direction
10 piston
10a part of piston in the inner milieu
10b part of piston in the outer milieu
12 outer load-carrying surface of the piston
14 distal end of the piston
16 proximal end of the piston
18 cross-section of the piston
19 periphery of the cross-section of the piston
20 housing
22 opening being adapted to receive the distal end of the piston
30 transmission module
33 screw
34 threaded outer surface
37 nut
38 threaded inner surface
40 separating member
42 sealing member
44 scraper
50 lubricating member
52 bushing
62 guiding member
70 motor
200 pressure build up chart
202 pressure built up in the actuator on a retracting stroke (solid line)
204 time to reach the atmospheric pressure (dotted line)
210 vacuum build up chart
212 vacuum built up in the actuator on an extending stroke (solid line)
214 time to reach the atmospheric pressure (dotted line)

The invention claimed is:

1. A linear electro-mechanical actuator for transferring a rotational motion to a linear motion comprising:
a piston having a distal end and a proximal end, the piston extending in an axial direction and having an outer load-carrying surface, the piston being at least partly arranged inside a housing and moveable relative to the housing in the axial direction;
the housing having an opening being adapted to receive the distal end of the piston and defining an inner milieu;
a transmission module operatively connected to the proximal end of the piston and adapted to transfer a rotational motion generated by a motor to a linear motion of the piston in the axial direction;
a separating member being arranged adjacent to the opening of the housing and in between the piston and the housing as seen in a radial direction; and
a lubricating member comprising a porous polymeric matrix and a lubricating material, the lubricating member being present in the inner milieu and arranged adjacent to the opening of the housing and in between the piston and the housing in the radial direction,
wherein the lubricating member is arranged adjacent to the separating member,
wherein the lubricating member is not load-carrying,
thereby allowing for lubrication of at least a portion of the outer load-carrying surface of the piston by the lubricating material upon movement of the piston.

2. The linear electro-mechanical actuator according to claim 1, allowing for lubrication of substantially the entire outer load-carrying surface of the piston by the lubricating material.

3. The linear electro-mechanical actuator according to claim 1, wherein said lubricating member is a separate component of said linear actuator.

4. The linear electro-mechanical actuator according to claim 1, wherein said lubricating member has the shape of a bushing.

5. The linear electro-mechanical actuator according to claim 1, wherein the separating member is arranged such that it surrounds the entire periphery of a cross-section of the piston-that forms a portion of the outer load-carrying surface of the piston.

6. The linear electro-mechanical actuator according to claim 1, wherein the separating member is a scraper.

7. The linear electro-mechanical actuator according to claim 1, wherein the separating is a sealing member.

8. The linear electro-mechanical actuator according to claim 1, further comprising a guiding member, wherein the lubricating member is arranged in between the separating member and the guiding member in the axial direction.

9. The linear electro-mechanical actuator according to claim 1, wherein said housing has the shape of a cylinder.

10. The linear electro-mechanical actuator according to claim 1, wherein the transmission module further comprises a rotating portion and a non-rotating portion being operatively engageable to each other, and wherein the non-rotating portion is operatively connected to the proximal end of the piston, and wherein the transmission module is adapted to transfer a rotational motion of the rotating portion to a linear motion of the piston in the axial direction via the non-rotating portion.

11. The linear electro-mechanical actuator according to claim 10, wherein the rotating portion is a screw and the non-rotating portion is a nut.

12. The linear electro-mechanical actuator according to claim 10, wherein the rotating portion is a nut and the non-rotating portion is a screw.

13. The linear electro-mechanical actuator according to claim 1, wherein said housing has the shape of a circular cylinder.

\* \* \* \* \*